United States Patent [19]

Niedermair

[11] Patent Number: 5,564,447
[45] Date of Patent: Oct. 15, 1996

[54] VAPOR CONTACT LOST CORE MELTOUT METHOD

[75] Inventor: Siegfried Niedermair, Newmarket, Canada

[73] Assignee: AWN Technologies Inc., Scarborough, Canada

[21] Appl. No.: 372,346

[22] Filed: Jan. 13, 1995

[51] Int. Cl.⁶ ................................. B08B 5/04; B08B 7/00
[52] U.S. Cl. ..................... 134/5; 134/11; 134/19; 134/21; 134/31
[58] Field of Search ..................... 134/5, 11, 17, 134/19, 31, 21

[56] References Cited

U.S. PATENT DOCUMENTS

| | | | |
|---|---|---|---|
| Re. 34,651 | 6/1994 | Hoopman et al. | 428/586 |
| 2,597,896 | 5/1952 | Oster | 134/17 |
| 3,010,852 | 11/1961 | Prange et al. | 134/5 |
| 4,909,806 | 3/1990 | Garbe | 8/647 |
| 4,975,300 | 12/1990 | Deviny | 427/54.1 |
| 4,981,727 | 1/1991 | Brinduse et al. | 427/385.5 |
| 4,997,032 | 3/1991 | Danielson et al. | 165/46 |
| 5,026,752 | 6/1991 | Wakabayashi et al. | 524/271 |
| 5,030,701 | 7/1991 | Garbe | 526/245 |
| 5,070,606 | 12/1991 | Hoopman et al. | 29/890.03 |
| 5,089,152 | 2/1992 | Flynn et al. | 252/194 |
| 5,104,034 | 4/1992 | Hansen et al. | 228/242 |
| 5,113,850 | 5/1992 | McQuinn | 128/632 |
| 5,125,978 | 6/1992 | Flynn et al. | 134/2 |
| 5,141,915 | 8/1992 | Roenigk | 503/227 |
| 5,159,527 | 10/1992 | Flynn | 361/317 |
| 5,178,954 | 1/1993 | Norman et al. | 428/422 |
| 5,205,348 | 4/1993 | Tousignant et al. | 165/46 |
| 5,251,802 | 10/1993 | Bruxvoort et al. | 228/121 |
| 5,283,148 | 2/1994 | Rao | 430/114 |
| 5,300,714 | 4/1994 | Pothapragada et al. | 570/179 |
| 5,317,805 | 6/1994 | Hoopman et al. | 29/890.03 |

OTHER PUBLICATIONS 3M, 1985 Product Information Brochure, "Fluorinert Electronic Liquids", Aug. 1985, entire document.

*Primary Examiner*—Zeinab El-Arini
*Attorney, Agent, or Firm*—Riches, McKenzie & Herbert

[57] ABSTRACT

A lost core process for removing an overmoulded lost core from within a hollow product which has been overmoulded over the core, wherein the core is melted and removed by a vapor contact method. Heat is transferred to the core by condensation of vapor of a heat transfer fluid, which has a boiling point higher than the melting point of the core and lower than the melting point of the product. The heat of condensation transferred to the core by the vaporized heat transfer fluid melts the core which then flows from the hollow part. This lost core process allows the manufacture of high quality surfaces on the insides of hollow parts, while permitting close wall tolerances to be maintained, and may be used to manufacture complex parts such as water pump housings and intake manifolds.

24 Claims, 2 Drawing Sheets

VAPOR CONTACT LOST CORE MELTOUT METHOD

SCOPE OF THE INVENTION

The present invention relates to the removal of a lost core from within a product which has been overmoulded over the core and, more particularly, to a vapour contact method of transferring heat to the core by condensation of vapour.

BACKGROUND OF THE INVENTION

Lost Core Process

Over the last decade, a process called "Lost Core" technology has evolved in the plastics injection moulding industry. The lost core process allows the manufacturer of hollow structures, which could previously not be moulded by use of retractable or collapsible moulds, or any other types of moulds with permanent core sections. The lost core process is used to manufacture such complex parts as water pump housings, automotive engine intake manifolds, and wheels for ultralight bicycles. The lost core process allows for the manufacture of high quality surfaces on the inside of the parts, while permitting close wall thickness tolerances to be maintained.

Blow moulding processes cannot produce complex shapes as compared with those which can be produced by the lost core process. Blow moulding cannot adequately maintain wall thicknesses or produce as high quality surfaces on the inside of the parts.

Other process are known which produce complex parts from a greater number of separate moulded sections, and, in a secondary operation, join them together, via ultrasonic or frictional welding, adhesive bonding, or other methods. Such processes have the disadvantages that the resultant inner surface of the part is disturbed by the joints and that properties of the part, such as impact resistance are frequently inferior. As well, such processes have the disadvantages associated with moulding a greater number of parts and handling them.

The "lost core" manufacturing process involves a number of different steps. First, a core, representing the exact inner geometry of the plastic part to be manufactured, must be casted or moulded. In most cases, a Sn-Bismuth alloy is used having a low melt temperature in the range of 100° C. and 200° C. Known alloys are preferred which do not show any significant thermal expansion or contraction in the range of use, that is from room temperature of about 20° C. to around 200° C., since their use makes mould design much simpler. Preferred such alloys do not exhibit greater than 1% expansion in this temperature range. Specific grade Sn-Bismuth alloys are preferred having a melting point in the range of 135° C. to 140° C. preferably 138° C. due to their minimal thermal expansion.

The casting of the lost core takes place in a closed mould, into which the tin-Bismuth alloy is pumped. Under normal circumstances a low pressure such as 6 bar is sufficient for such casting, resulting in relatively low clamping forces. After the lost core has cooled down somewhat and the surface of the core has solidified sufficiently that the core can be handled, the mould is opened and the core is removed. The core is then placed on a cooling conveyor to further cool down.

At the end of this cooling conveyor, the core is picked up and inserted into a plastic injection mould, where thermoplastic or thermoset materials are moulded over the core. After a desired cooling time, the plastic part with the core inside is removed from the mould. Next, the core is melted out from within the part such that the melted core will flow out from a molden state out of the hollow part. After the core has flowed out, the part is washed to minimize contamination of the part as by either particles of the core or compounds used to assist in removal of the core remaining on the part. The part is now ready for inspection and further assembly.

There are two basic known methods to melt the core from the plastic part, namely, a glycol bath method and an induction heat method.

Glycol Bath Method

In the glycol bath method, the part including the core are immersed in a glycol based liquid, which is heated, in most cases to 175° C. The residence time of the part in the gycol bath is typically approximately one hour, depending the size and volume of the core. To accommodate high volume production, such melt out baths are typically large, and particularly contain hanging conveyors, on which the parts are mounted and conveyed.

The size of typical meltout baths requires the use of large quantities of the glycol based liquids. These substances as typified by a product sold under the trade name LUTRON by BASF and are expensive. In normal use, the LUTRON liquid must be replaced every 12 months even when maintenance procedures are carefully followed. Contaminated LUTRON liquid is expensive to dispose of after its useful life.

The large size of the glycol bath has the disadvantage of significant heat losses in use, which losses reduce the energy efficiency of the glycol bath method.

With the glycol bath system, when the plastic parts emerge from the bath with the core removed, they are transported to a washing station. On the way to the washing station, some of the glycol liquid drips off the parts, and this creates collection and containment problems as well as resulting in a loss of the glycol liquid.

The purpose of the washing station is to remove from the part all remaining glycol liquid and particles of the core alloy which may remain on the part. For this purpose, water is used. Since the glycol liquid has a specific gravity, very close to that of water, it is difficult to separate glycol from water. A distillation process is employed to recover the glycol from the wash water, which process is a high energy consuming process. Removal of the glycol from the water is necessary since wash water, contaminated with glycol, cannot, environmentally or lawfully be discarded into a sewer system.

Induction Heat Method

In the induction heat method to melt out the core, the parts including the cores are removed from the plastic injection moulding machine, and then dipped into a small tank, again containing the same glycol solution as described above. However, in this tank, there is also an induction coil, with a shape similar to the outer shape of the moulded part. As is known by passing electric current through the induction coil, an electrical field is developed in the tank passing through the part and as a result of which, the metal core is heated. The core is heated until the core liquefies, and flows out of the plastic part.

The induction heat process is relatively fast and typically the metallic core may be melted out in just a few minutes, allowing for a much smaller physical size of the tank. However, the induction heat system has some major disadvantages. Firstly, the expensive glycol based liquid needs to be used in the bath so as to reduce temperature peaks within the plastic shell during the melt out operation. Secondly, the power consumption of such an induction system is very high due to the low efficiency of such induction heating of the core. Thirdly, localised temperature peaks can lead to damage of the plastic material, from which the part is moulded, and to faster degradation of the expensive glycol liquid.

One of the major drawbacks of the induction heat method is the life time of the induction coils. The tin-Bismuth alloy used as the core has the tendency to creep into the smallest crack or crevice and, being a very good electrical conductor, leads to short circuits of the coils resulting in the need to frequently replace the coils. Not only are coils expensive but the downtime of the system to replace coils represents a large loss in productivity.

SUMMARY OF THE INVENTION

Accordingly, to at least partially overcome these disadvantages of previously known methods, the present invention provides a method of removing an overmoulded lost core within a product by transferring heat to the core by contacting surfaces of the product and/or the core with the vapour of a heat transfer fluid to condense the vapour into liquid and release the vapour's heat of vaporization.

An object of the present invention is to provide a more efficient and economical method and apparatus for lost core melt out.

Another object is to provide a more environmentally friendly method and apparatus for lost core melt out.

Another object is to provide a method and apparatus for lost core melt out which maximizes the life of core alloys.

Another object is to provide a method and apparatus for lost core melt out which uses as a heat transfer fluid an inert non-toxic fluid which can readily be recovered and reused.

Accordingly, in one aspect the present invention provides a vapour contact method of removing an overmoulded lost core from within a product which has been overmoulded over the core and the core has a melting point less than a melting point of the product, the method comprising selectively melting the core utilizing a heat transfer fluid having a condensation point greater than the melting point of the core and less than a melting point of the product by steps of:

(1) heating liquid of the heat transfer fluid to vaporize it into vapour of the heat transfer fluid, and (2) transferring heat to the core by contacting surfaces of the core and the product with vapour of the heat transfer fluid to condense vapour of the heat transfer fluid into liquid of the heat transfer fluid releasing the heat of vaporization.

The present invention provides a method of heating an overmoulded lost core by condensing a vapour of a heat transfer fluid on the core and/or the part containing the core. The vapour on condensing and physically changing from a vapour to a liquid releases its heat of condensation. The heat of condensation is thereby at least in part transferred directly to the core or to the part and therefrom to the core.

For the vapour to condense on the part and core, the part and core must be at temperatures below the boiling point of the heat transfer fluid. For the core to be melted as is preferred, the boiling point of the heat transfer fluid must be greater than the melting point of the core.

More preferably, the boiling point of the heat transfer fluid is greater than the melting point of the core by at least 10° C., 20° C. or more preferably 30° C. to facilitate raising the core to its melting point timely and in view of heat transfer requirements inherent in any apparatus and through the plastic part.

Since only the core and not the plastic product is to be melted, the process should be controlled so that the temperature of the part is kept below the glass transition point and the melting point of the plastic part. Preferable, this may be achieved by having the boiling point of the heat transfer fluid below the glass transition point and melting point of the plastic part.

Having the boiling point of the heat transfer fluid below the glass transition point and the melting point of the plastic part is advantageous so that final removal of remaining portions of the heat transfer fluid from a part from which the core has been removed may be accomplished by vaporization of all the remaining heat transfer fluid. Preferably, any vapour of the heat transfer fluid may be recovered by being condensed and thereby separated from other gases.

As to the heat transfer fluid itself, heat transfer fluids suitable for the invention preferably have a boiling point greater than the melting point of the core, and less than the glass transition or melting point of the part. With the core having preferred melting point in the range of 100° C. to 200° C., and plastic parts having glass transition parts and melting point in the range of 200° C. to 400° C., heat transfer fluids may have boiling point between those two ranges may be selected for any particular combination of core and plastic.

Preferably, the heat transfer fluids have a relatively high heat of vaporization. Preferably, the liquid of the heat transfer fluids have a high thermal conductivity.

Heat transfer fluids useful in the method of the present invention preferably are: non-corrosive to the part and to the core, chemically unreactive with the part and the core and more preferably are essentially chemically inert. The heat transfer fluids are preferably non-explosive, non-flammable and non-toxic to life forms particular humans as though exposure to vapour or liquid through skin contact, inhalation and ingestion.

Preferred heat transfer fluids comprise relatively inert fluorinated organic compounds, preferably those in which all or essentially all of the hydrogen atoms are replaced by fluorine atoms. The prefix "perfluoro" as used in this application means that all, or essentially all, of the hydrogen atoms are replaced by fluorine atoms.

The fluorinated, inert fluids are preferably one or a mixture of fluoroaliphatic compounds having from about 5 to about 18 carbon atoms or more, and optionally containing one or more catenary heteroatoms, such as divalent oxygen, trivalent nitrogen or hexavalent sulfur, and having a hydrogen content of less than 5% by weight, preferably less than 1% by weight.

Suitable fluorinated, inert fluids useful in this invention include, for example, perfluoroalkanes or perfluorocycloalkanes, such as, perfluoropentane, perfluorohexane, perfluoroheptane, perfluorooctane, perfluoro-1,2-bis(trifluoromethyl)hexafluorocyclobutane, perfluorotetradecahydrophenanthrene, and perflourodecalin; perfluoroamines, such as, perfluorotributyl amine, perfluorotriethyl amine, perfluorotriisopropyl amine, perfluorotriamyl amine, perfluoro-N-methyl morpholine, perfluoro-N-ethyl morpholine, and perfluoro-N-isopropyl morpholine; perfluoroethers, such as perfluorobutyl tetrahydrofuran, perfluorodibutyl ether, perfluorobutoxyethoxy formal, perfluorohexyl formal, and perfluorooctyl formal; perfluoropolyethers; hydrofluorocarbons, such as pentadecafluorohydroheptane, 1,1,2,2-tetrafluorocyclobutane, 1-trifluoromethyl-1,2,2-trifluorocyclobutane, 2-hydro-3-oxaheptadecafluorooctane.

Suitable fluorinated, inert fluids include those commercially available from 3M Company under the trade mark "Fluorinert" and include fluorinated, inert fluids taught in U.S. Pat. Nos. Re 34,651, 5,317,805, 5,300,714, 5,283,148, 5,251,802, 5,205,348, 5,178,954, 5,159,527, 5,141,915, 5,125,978, 5,113,860, 5,104,034, 5,089,152, 5,070,606, 5,030,701, 5,026,752, 4,997,032, 4,981,727, 4,975,300, 4,909,806, the disclosure of which are incorporated herein by reference.

Preferred flourinert fluids are FLOURINERT FC-40, FC-43, FC-5311, FC-70 and FC-5312 having boiling points of 155° C., 174° C., 215° C., 215° C. and 215° C. respectively. Most preferred of these is 3M FLUORINERT FC-43 which is perfluorotributylamine.

The FLUORINERT fluids may preferably be used by themselves to assist in evacuation of the vessel and recovery. However, small amounts of additives which preferably have similar boiling points may also be utilized.

The method is preferably carried out keeping the core while molten in a non-oxidizing environment, and most preferably under a suitable non-oxidizing gas blanket, to reduce oxidation and degradation of the core material as with oxygen.

BRIEF DESCRIPTION OF THE DRAWINGS

Further aspects and advantages of the present invention will be apparent from the following disclosure taken together with the accompanying drawings in which.

DESCRIPTION OF THE PREFERRED EMBODIMENTS

Figure 1:
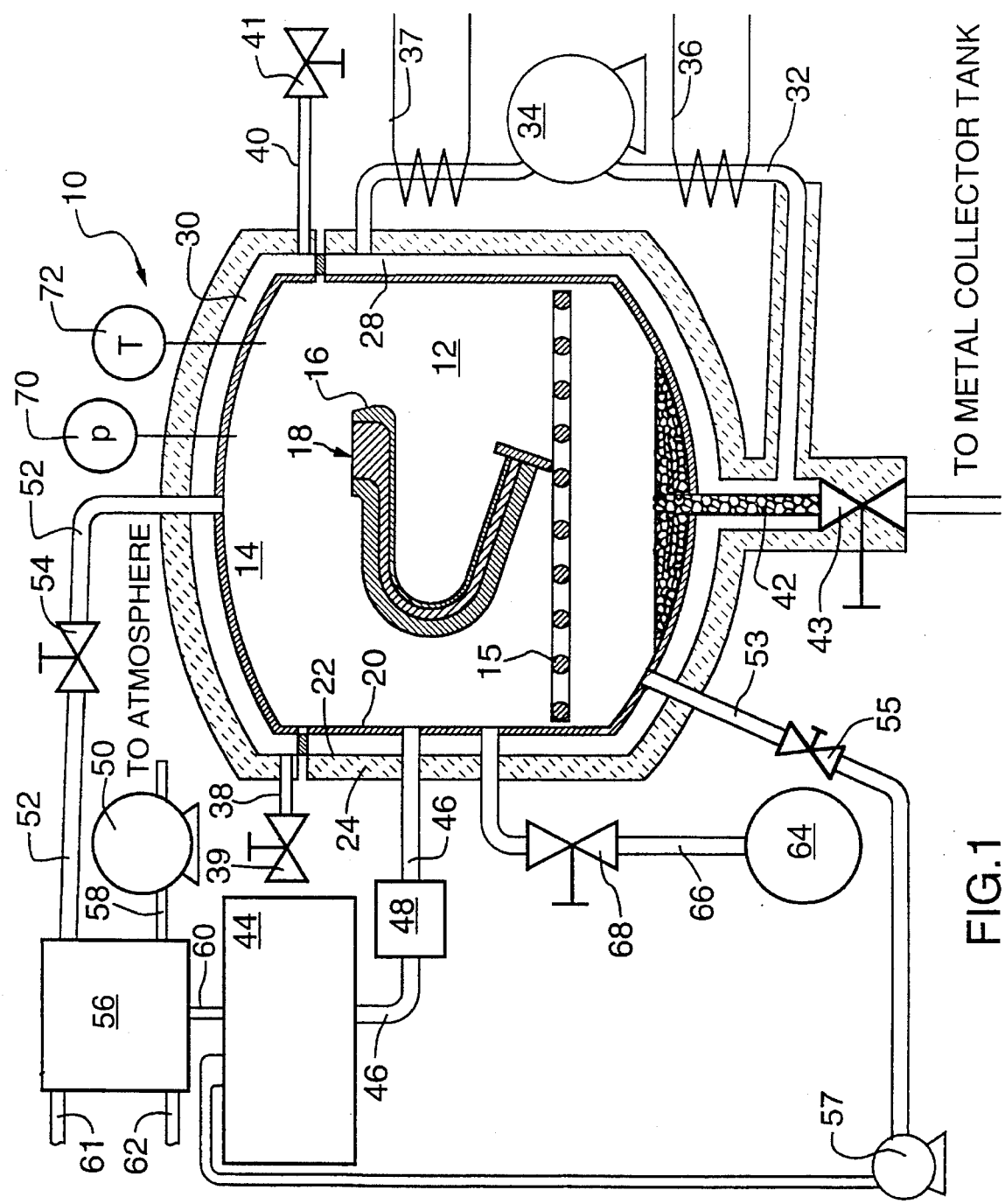
FIG. 1 is a schematic flow diagram showing a first embodiment of an apparatus for use accordance with the method of the present invention.

Reference is made first to FIG. 1 which shows a schematic flow diagram of an apparatus for carrying out the method of the invention.

The apparatus has a vessel 10 comprising a lower drum 12 and a removable top 14.

A support rack 15 is mounted within the drum 12 so as to receive and support a part 16 with its internal core 18. FIG. 1 schematically shows the part 16 as a manifold for an automobile engine in cross-section so as to show the core 18. As shown in FIG. 1, part 16 has at least one opening therein providing communication through part 16 to the core 18 and through which the melted core 18 is removed.

Vessel 10 is double walled having an inner wall 20 and an outer wall 22 with space therebetween. A layer of insulation 24 is provided continuously about the outer wall to reduce heat loss from the vessel 10. With the top 14 secured to drum 12 the inner vessel forms a sealed chamber into which the part 16 is placed to melt out the core 18.

Within the drum 12 the space between the inner wall 20 and outer wall 22 is a closed space indicated as 28. Within the top 14 the space between the inner wall 20 and the outer wall 22 is a closed space indicated as 30.

A temperature control system is provided to control the temperatures in areas of the vessel 10. The temperature control system shown has a first circulation system to control the temperature of the inner wall of the drum 12 comprising conduit 32 connected to the space 28 between the walls of the drum and forming a closed loop including a circulating pump 34 and a heat exchanger 36. The heat exchanger 36 is in the embodiment shown as a heating source whereby a circulating fluid such as oil, water or the like may be circulated by pump 34 to maintain the inner wall 20 in the drum 12 at a desired controlled temperatures as by use of a thermostats and control devices. A cooling source 37 is preferably provided in the circulation system for cooling of the circulating fluid as may be desired.

The temperature control system shown has a second system to control the temperature of the inner wall 20 in the top 14. The second system is merely illustrated as conduit sections 38 and 40 in communication with the space 30 in the top 14 and through which fluid, preferably cooling water, may flow as controlled by valves 39 and 41. The conduit sections may or may not be part of a closed loop for the circulating fluid and may also be arranged to both heat and cool the top.

A system is shown to permit controlled removal of melted core. In this regard, the inner wall 20 of the drum 12 at its bottom forms a hopper-like bottom wall which angles to the centre where a conduit 42 with an associated drainage valve 43 is provided. Molten core material under gravity flows from within part 16 through at least one opening in part 16 and drops from the part 16, through the support rack 15 and down to accumulate in the sump-like bottom of the drum 12 and may be removed by opening valve 43.

A system is provided for adding and recovering the heat transfer fluid. This system includes a reservoir 44 for liquid heat transfer fluid, conduit 46 connecting the reservoir 44 to the vessel 10 and a metering device 48 such as a valve or controlled pump for controlling the addition of liquid heat transfer fluid to vessel 10.

A vacuum pump 50 is provided as a device to evacuate vapour from the vessel. Vacuum pump 50 is connected via conduit 52 to the inside of the vessel 10 at the upper centre of removable top 14. Conduit 52 passes through valve 54 and a water cooled condenser 56 having a gas exit 58 connected to the vacuum pump 50 and a condensate exit 60 connected to the reservoir 44. Cooling water inlet and outlet 61 and 62 are shown for the condenser 56. In use vacuum pump 50 draws gas from within the vessel 10, with vapour of the heat transfer fluid being condensed to flow into reservoir for recycling.

To assist in evacuation of vapour of the heat transfer fluid from the vessel, a gas injection system is provided including a reservoir 64 containing one or more inert gases such as nitrogen and argon, the gas injection system being connected via conduit 66 with an associated control valve 68.

The apparatus has various sensor and control systems including at least a pressure sensor 70 and a temperature sensor 72 which sense the pressure and temperature within the vessel 10.

Exemplary carrying out of the method of the present invention in association with the apparatus of FIG. 1 is now described using the following assumptions:

(a) the core comprises a Sn-Bismuth alloy having a melting point of 138° C.;

(b) the part has been injection moulded over the core and comprises a plastic material having a glass transition temperature and a melting point greater than 220° C.;

(c) the heat transfer fluid comprises FLUORINERT (trade name) Electronic Liquids FC-43 sold by 3M and having a boiling point of 174° C.

In a condition when the vessel 10 is empty of all heat transfer fluid, the top 14 is opened and a part 14 which is at a temperature below 138° C. and which has its core 18 inside is placed on rack 15. Vessel 10 is closed with the top 14 secured to drum 12 to form a sealed pressure vessel. Gas in the vessel may be substantially withdrawn by operation of the vacuum pump 50.

The temperature of the inner wall of drum 12 is increased to at least 174° C. and preferably to about 200° C. by use of the heat pump 34 and heat exchanger 36 to circulate heated fluid through the conduit 32 and space 28, and maintained at desired temperatures of at least 174° C. and preferably 200° C.

Liquid of the heat transfer fluid at a temperature below 174° C. is metered from reservoir 44 into the vessel via conduit 46 by metering device 48. The liquid on entering the drum is heated to 174° C. and vaporizes as, for example, by contacting the inside wall 20 of the drum. The vapour of the heat transfer fluid fills the entire vessel and thereby comes into contact with surfaces of the part 16 and/or its core 18 which is cooler than the vapour. The vapour condenses thereby releasing its heat of vaporization (also referred to as heat of condensation) which heat is at least in part received by the part 16 and/or the core 18. To the extent, the surface of the plastic comprising the part 16 is heated, this will raise the temperature of the part 16 which will result in heat transfer through the plastic to the core 18.

Vapour of the heat transfer fluid which condenses on the part or core then drips as a liquid under gravity from the part or core downward in the vessel 10 whereby it is heated to at least 174° C. and is vaporized back into a vapour which can rise up into contact again with the part. Liquid which drips from the part and core may be heated by contacting the heated inner wall 20 of the vessel 10 or other heated elements in the vessel 10 such as molten core disposed in the bottom of the vessel.

With condensation of vapour on the part and its core with the time, the temperature of the part and the core will be raised to 138° C. and above whereby the core will melt. On melting the liquid alloy will flow under gravity down through the rack 15 to collect in the sump formed in the bottom of the drum, and be maintained therein heated to at least 174° C. and preferably 200° C. as by heat from the inner wall.

When all the core has been melted from the part, the heat transfer fluid is preferably evacuated from the vessel before opening the top 14 to remove the part 16 and insert a new part with a core. Evacuation may be accomplished merely by operating the vacuum pump to withdraw the heat transfer fluid as a vapour. With continued heating by the inner wall of the drum, any heat transfer fluid as a liquid will be vaporized and hence evacuated by the vacuum pump. Of course, any of the heat transfer fluid which is evacuated will be condensed in the condenser and recycled to reservoir 44 for reuse. Highly efficient condensation of almost 100% of the heat transfer fluid may be achieved using suitable condenser configurations and ambient 20° C. to 30° C. cooling water.

To the extent the drum of the vessel 10 is in operation maintained at temperatures in excess of 174° C. this assists in prompt vaporization and evacuation of the heat transfer fluid.

Once the heat transfer fluid is evacuated, the vessel 10 may be opened, the old part removed and a new part inserted. Preferably, to remove any vacuum and to provide an inert gas blanket over the melted alloy in the sump which prevents air and/or oxygen from contacting the hot melted alloy, an inert gas is added to the vessel via the control valve 68 during purging of the tank with the vacuum pump or after such purging. Argon and argon/nitrogen mixtures are preferred inert gases. Due to its specific gravity at elevated temperatures, nitrogen may rise when the top 14 of drum 12 is opened, leaving the molten core at least partially exposed to air and/or oxygen.

When desired, melted alloy may be withdrawn from the vessel 10 using valve 43.

However, it is not necessary to remove the heat transfer fluid as a vapour after the core has melted from the part. In an alternate method, after the core has been melted, the circulating fluid within space 28 may be cooled, preferably rapidly by the cooling source 37 to a temperature preferably well below the condensation point of the heat transfer fluid. This cools the inner wall 20 of drum 12, causing substantially all the vapour of the heat transfer fluid to condense on wall 20 and run to the bottom of drum 12 as condensed heat transfer fluid to collect on top of the core material.

After substantially all the vapour of the heat transfer fluid has condensed and collected as a liquid at the bottom of drum 12, the condensed heat transfer fluid is preferably withdrawn from the bottom of the drum 12 through a conduit 53 having control valve 55 for recycling as for example via a pump 57 to container 44. After removal of the condensed heat transfer fluid, some vapour will remain in the cooled drum 12. This residual vapour may be evacuated through conduit 52 to be condensed by condenser 56 and the drum 12 may be filled with an inert gas before opening to protect the melted core from oxidation when the drum is opened. However, after withdrawing the condensed heat transfer fluid from the drum as the amount of heat transfer fluid remaining as a vapour in drum 12 is small, losses of heat transfer fluid are small if the drum 12 is not evacuated prior to opening top 14. Loss of heat transfer fluid remaining as vapour may also be small where the heat transfer vapour is denser than air and the drum opens at its top as shown. Cooling of the melted core material by the circulating fluid may reduce the tendency of the melted core material to oxidize sufficiently to avoid the need to either evacuate the drum of heat transfer vapour and/or to provide a protective inert gas blanket.

In a variation of this alternate method, after substantially all the vapour of the heat transfer fluid has been condensed and collected as a liquid at the bottom of drum 12, the drum 12 may be opened without evacuation and with both the condensed heat transfer fluid and core material to remain at the bottom of the drum 12 during opening of top 14. Some vapour of the heat transfer fluid may escape while the top is open, although this may be minimal depending on the temperatures and the density of the heat transfer vapour. In this variation, the melted core material is covered by condensed heat transfer fluid while the top 14 is open and it is not necessary to provide an inert gas blanket over the metal.

In use of the apparatus of FIG. 1, when the core is being melted from within a part, it is preferred that vapour circulates within the vessel 10 to contact the part and core. This may be assisted by mechanical devices such as fans or impellers with the vessels. As well, circulation of the heat transfer fluid can be achieved by varying the temperature of the inner wall of the vessel. By cooling the inner wall of the top of the vessel, a temperature differential may be established between the upper and lower portions of the vessel which will assist convective flow of the heat transfer fluid vapour increasing contact of vapour with the part and/or core. In some circumstance, inner wall of the top may be maintained at temperatures below 174° C. to promote condensation of the vapour on the top and dripping of condensate from the top down into the heated lower drum.

Figure 2:
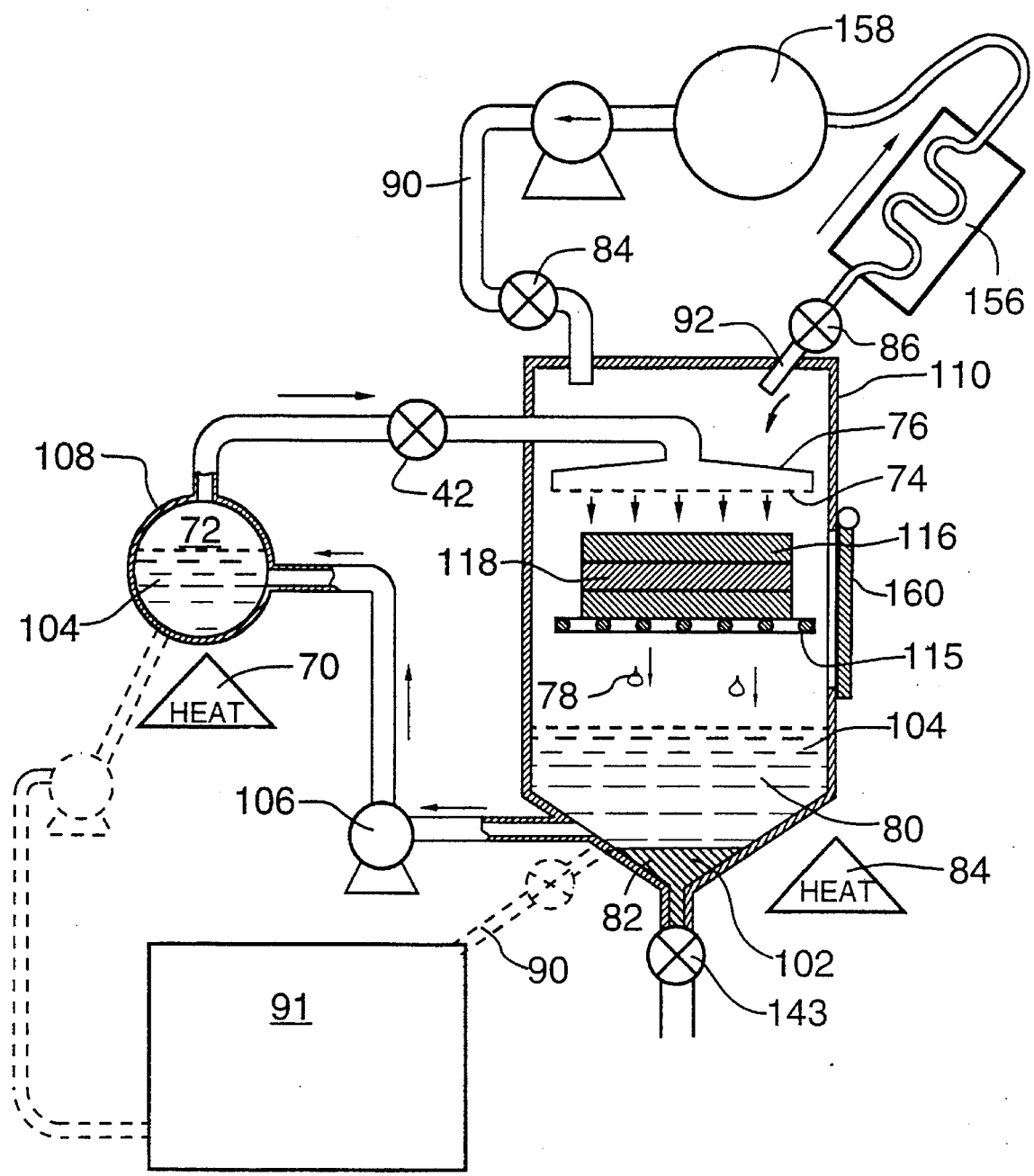
FIG. 2 is a schematic flow diagram showing a second embodiment of an apparatus for use in carrying out the method of the present invention.

Reference is made to FIG. 2 which shows a second schematic apparatus to carry out the invention. The second embodiment show containment vessel 110 having a supported rack 115 upon which a plastic part 116 and its overmoulded core 118 are supported. The vessel 110 has a hopper-like bottom which receives under gravity melted core material 102 and liquid 104 of the heat transfer fluid which has a lower density than the melted core material 102. A pump 106 pumps liquid 104 to a vaporizer 108 where a heat source 70 vaporizes the liquid into a vapour 72 of the heat transfer fluid. Vapour 72 passes along conduit to enter the vessel 110 and become sprayed evenly therein via nozzles 74 of a distributor 76. The vapour 72 is directed in the vessel into contact with the part 116 and its core 118 upon which contact the vapour condenses and condensate drops 78 of the liquid 104 flow downwardly to join the bath 80 of liquid in the bottom of the vessel 110. Heat of condensation is released on the vapour condensing, particularly with the part and core receiving this heat which increases their temperatures. When the temperature of the core rises to its melting point, the core melts and melted core material 102 flows from at least one opening, part 116 through the rack 115 to form a pool 82 of melted core material in the bottom of the vessel 110, capable of removal via valve 143. Alternate heat source 84 indicates that the pool 82 and bath 80 in the vessel 10 may be heated by suitable means.

When all the core has been melted out and with the temperature of the entire part and the vessel raised to a temperature above the melting point of the core material, heating and the flow of the heat transfer fluid may be stopped as by closing valve 42. Purge gas such as nitrogen and/or argon is inlet by opening valves 84 and 86 and purge gas introduced via conduit 90 to exit the vessel conduit 92 which passes through a condenser 156 such that vapour of the heat transfer fluid is condensed and flows back to the vessel 110 as a liquid while the purge gas returns to a reservoir 158. Once all the vapour of the heat transfer fluid is purged and liquified, the vessel 110 may have its door 160 opened to remove the part 114 and insert a new part with a core. The cooled liquid heat transfer fluid on top of the core material can protect the metal from oxidation when the vessel 110 is opened.

By preferred control, losses of heat transfer fluid may be minimal if the heat transfer fluid, preferably cooled, may remain as a liquid at the bottom of the vessel when the door is opened.

Shown in dotted lines is a conduit 90 with an associated valve to permit drawing of the bath 80 of liquid from the vessel 110 to a reservoir 91 if it is desired to totally evacuate the liquid heat transfer fluid before opening the vessel. Residual vapour is preferably evacuated by purging with inert gas and providing an inert gas blanket over the core material to protect it from oxidation when door 160 of vessel 110 is opened.

The invention has been described with reference to preferred embodiments. Many modifications and variations will occur to persons skilled in the art. For a definition of the invention, reference is made to the following claims.

What I claim is:

1. A vapour contact method of removing a core from within a product which has been overmoulded over the core, said product having at least one opening and the core having a melting point less than a melting point of the product, the method comprising the steps of:

(a) selectively melting the core without melting the product utilizing a heat transfer fluid having a condensation point greater than the melting point of the core and less than a melting point of the product by steps of:

(i) heating liquid of the heat transfer fluid to vaporize it into vapour of the heat transfer fluid, and (ii) transferring heat to the core by contacting surfaces of the core and the product with vapour of the heat transfer fluid to condense vapour of the heat transfer fluid into liquid of the heat transfer fluid releasing the heat of vaporization; and (b) removing the core which has been melted, from within the product through said at least one opening.

2. A method as claimed in claim 1 wherein said melting point of the core is less than a glass transition point and melting point of the product.

3. A method as claimed in claim 2 wherein said product comprises plastic material.

4. A method as claimed in claim 3 wherein said product is overmoulded over the core by injection moulding and the plastic material comprises thermoplastic or thermosetting plastic material.

5. A method as claimed in claim 1 wherein said core comprises metal.

6. A method as claimed in claim 5 wherein said core comprises a metal alloy having a melting point between 100° C. and 200° C. and does not exhibit greater than 1% thermal expansion or contraction in a range of temperatures of 20° C. to 200° C.

7. A method as claimed in claim 5 wherein said core comprises a Tin-Bismuth alloy.

8. A method as claimed in claim 7 wherein said Tin-Bismuth alloy has a melting point in a range of 135° C. to 140° C.

9. A method as claimed in claim 1 wherein said heat transfer fluid has a condensation point at least 30° C. greater than the melting point of the core.

10. A method as claimed in claim 9 wherein said heat transfer fluid is chemically inert.

11. A method as claimed in claim 10 wherein said heat transfer fluid is non-corrosive.

12. A method as claimed in claim 11 wherein said heat transfer fluid is non-flammable, non-explosive and non-toxic to human by contact or ingestion.

13. A method as claimed in claim 10 wherein the vapour of said heat transfer fluid is denser than air.

14. A method as claimed in claim 10 wherein said heat transfer fluid comprises fluorinated organic compounds.

15. A method as claimed in claim 14 wherein said fluorinated organic compounds are completely fluorinated.

16. A method as claimed in claim 14 wherein said fluorinated organic compounds are selected from fluorinated hydrocarbons, perfluorocarbon compounds and perfluoro tributylamines.

17. A method as claimed in claim 1 further including removing all heat transfer fluid from the product by heating the product to a temperature above a boiling point of the heat transfer fluid and below a melting point of the product.

18. A method as claimed in claim 1 wherein said step (a)(ii) is carried out in a sealed vessel, and said method further includes evacuating all heat transfer fluid from the vessel as a vapour by heating the vessel to temperatures above a boiling point of the heat transfer fluid, and recovering evacuated vapour by condensation in a condenser.

19. A method as claimed in claim 18 wherein evacuating all heat transfer fluid includes purging vapour of the heat transfer fluid from the vessel with an inert gas having a boiling point less than ambient temperature.

20. The method of claim 1, wherein step (b) comprises allowing the melted core to flow out of the product under gravity through said at least one opening in the product.

21. A vapour contact method of removing a core from within a product which has been overmoulded over the core, said product having at least one opening and the core having a melting point less than a melting point of the product, the method comprising the steps of:
  (i) selectively melting the core without melting the product utilizing a heat transfer fluid having a condensation point greater than the melting point of the core and less than a melting point of the product by steps of:
    (a) heating liquid of the heat transfer fluid to vaporize it into vapour of the heat transfer fluid, and
    (b) transferring heat to the core by contacting surfaces of the core and the product with vapour of the heat transfer fluid to condense vapour of the heat transfer fluid into liquid of the heat transfer fluid releasing the heat of vaporization, and
  (ii) permitting the core which has been melted, to flow out from within the product under gravity through said at least one opening;
  said method being carried out in an apparatus comprising:
    a sealable vessel comprising a lower drum and a removable top;
    support means inside the vessel to support the product; sump means inside the vessel below the product supported on the support means for collecting liquid of the heat transfer fluid and the melted core;
    fluid control means for adding liquid heat transfer fluid to the vessel;
    temperature control means including means for heating the liquid of the heat transfer fluid and vapourizing it into vapour of the heat transfer fluid;
    draining means for removing the melted core from the sump means; and
    evacuating means for removing the heat transfer fluid from the vessel.

22. The method of claim 21, wherein said evacuating means of said apparatus comprises conduit means through which the liquid of the heat transfer fluid is drained from the sump means.

23. The method of claim 22, wherein said evacuating means of said apparatus further comprises vacuum pump means to remove vapour of the heat transfer fluid from the vessel and condenser means to condense the vapour of the heat transfer fluid removed by the vacuum pump means.

24. The method of claim 21, wherein said temperature control means of said apparatus includes means to cool the heat transfer fluid to temperatures at which substantially all the heat transfer fluid in the vessel is in the form of a liquid.

* * * * *